United States Patent [19]
Sollich

[11] 3,768,553
[45] Oct. 30, 1973

[54] COOLING TUNNEL
[75] Inventor: Helmut Sollich, Talle, Germany
[73] Assignee: Sollich OHG
[22] Filed: Dec. 20, 1971
[21] Appl. No.: 209,807

[30] Foreign Application Priority Data
Mar. 27, 1971 Germany.................. P 21 14 906.4

[52] U.S. Cl.......................... 165/120, 62/63, 62/378
[51] Int. Cl................................................ F24h 3/02
[58] Field of Search........................ 62/63, 378, 380; 165/120

[56] References Cited
UNITED STATES PATENTS

| | | | |
|---|---|---|---|
| 2,483,605 | 10/1949 | Abramson.......................... | 63/378 X |
| 2,974,497 | 3/1961 | Carpenter et al...................... | 62/63 |
| 3,472,043 | 10/1969 | Nelson............................ | 165/120 X |
| 2,307,562 | 1/1943 | Bausman.......................... | 62/380 X |

Primary Examiner—Charles J. Myhre
Attorney—Alan H. Levine

[57] ABSTRACT

A cooling tunnel having an L-shaped cross-section defining a horizontal leg and a vertical leg. The material-receiving run of a continuous conveyor passes through the horizontal leg, and the reverse conveyor run is located outside the tunnel. An evaporator is arranged within the vertical leg, and a guide sheet extends from the evaporator into the horizontal leg dividing the latter into upper and lower cooling zones. A ventilator directs air downwardly through the evaporator and through the cooling zones in directions perpendicular to the direction of movement of the conveyor. The lower end of the vertical leg is formed to collect condensation and is provided with an outlet for removing condensed water.

7 Claims, 1 Drawing Figure

PATENTED OCT 30 1973 3,768,553
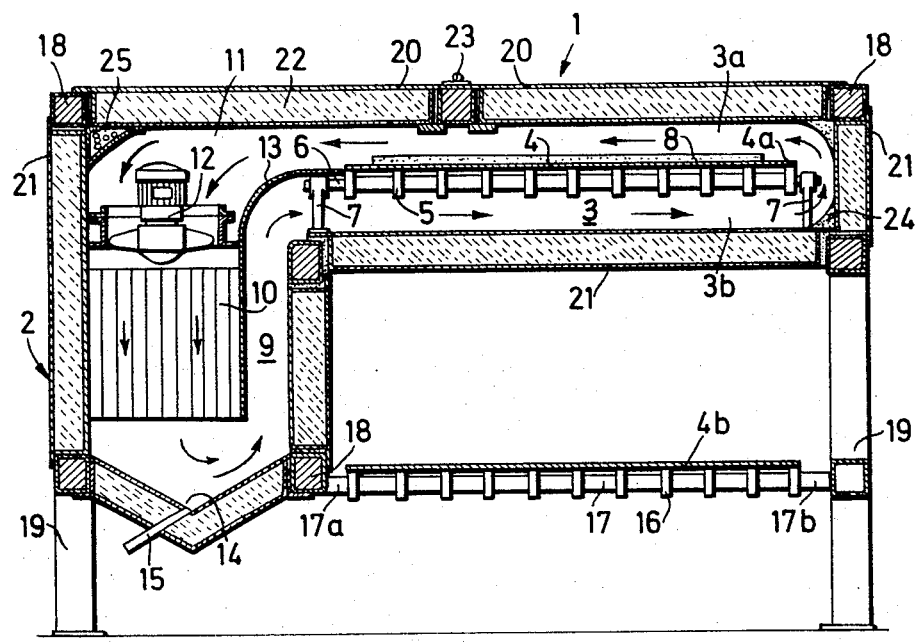

COOLING TUNNEL

The invention relates to a cooling tunnel having a continuous conveyor belt for the material to be cooled, which tunnel is intended to be preferably employed as a member of a working train in the praline or biscuit industries.

For example, it is the general practice with the production of chocolate-coated biscuits to continuously feed the biscuits, passing out of a band oven, to a coater, in which the biscuits are totally or partially provided with a chocolate coating. In such an arrangement, it is indispensable to arrange a cooling tunnel between the band oven and the coater, in which tunnel the biscuits are cooled down to a temperature at which they are capable of being coated, i.e., at ca. 22°–24°C. This appears to be necessary due to the fact that the chocolate paste of the coating would be hurt if the biscuits were delivered at a higher temperature. Cooling tunnels, associated with such a coater due to the aforementioned reason, are always required in the praline industries where hot or warm stuffings are handled for final products, coated with chocolate or similar temperature-sensitive substances.

For meeting these requirements the provision of a cooling tunnel is known, the biscuits being advanced through the tunnel on a continuous net belt made of steel wire. Cold air is blown into a pressure chamber, located over the net belt, the air flowing in a vertical direction through a perforated plate onto the biscuits or other baked articles. It has, however, been found that these and other known cooling tunnels still do not entirely fulfill their intended purpose and the requirements set for them. This is especially true when the cooling tunnel is intended to be used selectively in a high-efficiency train in the form of plates or continuous belts, not only for cooling of single articles located separately on the belt, but also for cooling of stuffings.

It is an object of the invention to provide a cooling tunnel not having the above named disadvantages.

It is another object of the invention to provide a cooling tunnel having a high cooling efficiency but which occupies a limited space and can readily be set up between two other stations of a working train.

It is a further object of the invention to provide a cooling tunnel which solves the condensation problem which is normally a serious problem depending upon the type of material being cooled.

It is an additional object of the invention to provide a cooling tunnel in which all parts are easily accessible for cleaning purposes; this is particularly important when sticky substances are being cooled.

Toward these ends, the invention provides a cooling tunnel with an L-shaped cross section. That part of the conveyor belt receiving the articles is led through the horizontally arranged longer leg of the L-shaped cross-section. At least one evaporator is incorporated in the vertical shorter leg of the L-shaped cross-section, and at least one ventilator is associated with each evaporator. The empty reverse run of the conveyor belt is led back below the longer leg of the L-shaped cross-section outside the tunnel.

A further feature of the invention resides in arranging the ventilators and evaporators in the intersection between the two legs of the L-shaped cross-section. Cooling air is directed transverse to the conveying direction of the conveyor belt and flows downwardly past the evaporator. The vertical shorter leg has a V-shaped cross-section, and the condensation drain, formed thereby, is provided with at least one outlet for condensed water.

The advantages obtained with the invention include the fact that the cooling tunnel, which is to be arranged before the coater, may be shorter than is possible with known cooling tunnels. Furthermore, moisture taken up by the cooling air, which passes the material to be cooled and condenses at the evaporators, continuously drops down into the condensed water drain. In addition, the cooling tunnel is easily accessible from all sides so that it may be easily cleaned.

One embodiment of the invention is shown in the drawing and will be described more specifically below; the drawing shows a cross-section through a cooling tunnel.

The cooling tunnel chosen to illustrate the invention has an L-shaped cross-section, the longer leg 1 of the L-shaped cross-section being horizontally arranged, and the shorter leg 2 of the L-shaped cross-section extending vertically downwards.

The inner space 3 of the longer leg 1 contains the upper run of a steel conveyor belt 4, driven in a manner not shown. Conveyor belt 4 is guided on rollers 5, all of which are rotatably arranged on a single shaft 6, the rollers being axially spaced apart along the shaft. Rollers 5 are preferably made of stainless steel, having a coating of synthetic material, and run on bearings of synthetic material as a result of which they are maintenance free, Shaft 6 rests on supports 7, which extend to half the height of the inner space 3. A continuous strand 8 of the material to be cooled is shown on the steel conveyor belt 4. This may be, for example, a strand of a caramel or toffee stuffing, which at increased temperature is continuously extruded or poured on to the steel conveyor belt 4 at the entrance of the cooling tunnel. The strand is cooled down to a temperature of 18° – 22°C in the cooling tunnel, so that immediately after leaving the cooling tunnel, it may be further handled, e.g., cut into bars which then are fed to a chocolate coater.

The inner space 9 of the shorter leg 2 contains an evaporator 10, which cooperates with a compressor (not shown) located outside the cooling tunnel, one compressor possibly being associated with several evaporators 10. Above the evaporator 10 at least one ventilator 12 is provided in the intersection 11 of the two legs 1 and 2, the ventilator conveying the air in the cooling tunnel downwardly against the evaporator 10, and causing air to flow around the interior of the tunnel as indicated by the arrows.

Between the evaporator/ventilator combination 10/12 and the steel conveyor belt 4 a guide sheet 13 is provided, which together with the steel conveyor belt 4 in the inner space 3 of the longer leg defines an upper cooling zone 3a and a lower cooling zone 3b. The arrangement is such that these two cooling zones can only communicate with each other at the free end 4a of the steel conveyor belt.

The lower end of the shorter leg 2 has a V-shaped cross-section thereby defining a condensation drain 14 which is provided with at least one outlet 15 for condensed water.

The empty reverse run 4b of the steel conveyor belt 4 passes outside the cooling tunnel over rollers 16, which are rotatably arranged on shaft 17. One end 17a of the shaft 17 is attached to the frame structure 18 of the cooling tunnel and the other end 17b of the shaft is secured to one of the support posts 19 for the tunnel.

Hoods 20 and linings 21 of the cooling tunnel are double-walled and provided with insulating foam filling 22. The hoods 20 can be swung upward towards the middle of the tunnel over a ledge 23, and the linings 21 can be lifted out of the frame structure. In each corner of the interior of the tunnel a rubber ledge 24 may be provided, except one corner may be used to accommodate electrical cables 25.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A cooling tunnel comprising:
   a. an L-shaped housing including a horizontally arranged leg and a vertically arranged leg,
   b. a continuous conveyor belt having a material-receiving run located within said horizontal leg and a reverse run located outside said housing, said material-receiving run being arranged to define spaces both above and below it within said horizontal housing leg,
   c. an evaporator located within said vertical leg,
   d. a ventilator arranged to blow air through said evaporator; and
   e. means for guiding air from said ventilator through the spaces above and beneath said conveyor in a horizontal direction transverse to the direction of movement of said conveyor.

2. A cooling tunnel as defined in claim 1 wherein said ventilator is arranged at the intersection of said horizontal and vertical legs.

3. A cooling tunnel as defined in claim 1 wherein said ventilator is arranged above said evaporator and directs air downwardly through said evaporator.

4. A cooling tunnel as defined in claim 1, said guiding means including means between said evaporator and said conveyor belt for guiding air moving from said evaporator toward said conveyor.

5. A cooling tunnel as defined in claim 1 including guide means divides said horizontal leg into upper and lower cooling zones, said guide means being spaced from the end of said horizontal leg remote from said vertical leg to define a communication path for air flowing from one of said zones to the other.

6. A cooling tunnel as defined in claim 1 wherein the lower end of said vertical leg is provided with means for collecting condensation, and an outlet for removing the condensation collected.

7. A cooling tunnel as defined in claim 6 wherein said collecting means includes the lower end of said vertical leg being formed with a V-shaped cross-section.

* * * * *